(12) United States Patent
Stotz et al.

(10) Patent No.: US 6,914,855 B2
(45) Date of Patent: Jul. 5, 2005

(54) CIRCUIT FOR DRIVING MOTOR COILS IN STEPPING MOTORS

(75) Inventors: Gerhard Stotz, Eisingen (DE); Helmut Zachmann, Remchingen (DE)

(73) Assignee: Timex Group B.V. (NL)

( * ) Notice: Subject to any disclaimer, the term of this patent is extended or adjusted under 35 U.S.C. 154(b) by 64 days.

(21) Appl. No.: 10/256,481

(22) Filed: Sep. 27, 2002

(65) Prior Publication Data

US 2004/0061471 A1 Apr. 1, 2004

(51) Int. Cl.$^7$ .............. G04F 5/00; H02P 7/64; H02P 8/00; G05B 19/40
(52) U.S. Cl. ............ 368/157; 368/162; 368/163; 368/168; 318/111; 318/685; 318/696
(58) Field of Search .............. 368/155–183; 318/111–113, 685, 696, 254

(56) References Cited

U.S. PATENT DOCUMENTS

| | | | |
|---|---|---|---|
| 4,503,369 A | * | 3/1985 | Nishijima et al. .......... 318/254 |
| 4,558,268 A | | 12/1985 | Besson et al. |
| 4,634,942 A | * | 1/1987 | Naruto .................. 318/111 |
| 4,670,693 A | * | 6/1987 | Kazami et al. ........... 318/112 |
| 4,855,778 A | * | 8/1989 | Ishimura et al. .......... 396/48 |
| 5,534,758 A | * | 7/1996 | Yamamoto et al. ........ 318/112 |
| 6,246,205 B1 | | 6/2001 | Kujira et al. |
| 6,344,719 B2 | * | 2/2002 | Shibazaki et al. ......... 318/34 |

FOREIGN PATENT DOCUMENTS

| | | |
|---|---|---|
| GB | 2058414 A | 4/1981 |
| JP | 5612578 A | 2/1981 |
| JP | 57040672 A | 3/1982 |
| JP | 58108484 A | 6/1983 |

\* cited by examiner

Primary Examiner—David Martin
Assistant Examiner—Michael L. Lindinger
(74) Attorney, Agent, or Firm—Carmody & Torrance LLP

(57) ABSTRACT

A circuit for selectively driving n motor coils associated with a plurality of stepping motors, wherein only (n+1) motor coil drivers are needed. A timepiece that utilizes such a circuit is also provided.

16 Claims, 6 Drawing Sheets

CIRCUIT FOR DRIVING MOTOR COILS IN STEPPING MOTORS

BACKGROUND OF THE INVENTION

The present invention is directed to circuits for driving a plurality of stepping motor coils driven by driving impulses with both positive and negative (i.e. alternating) polarity, and in particular, to an improved circuit for driving a plurality of stepping motor coils with a minimal number of stepping motor coil drivers.

Wristworn timepieces such as chronograph watches, typically comprise a plurality of unidirectional or bi-directional stepping motors. One of the more popular types of stepping motors are the so-called "Lavet" type, and causing the rotation of the rotor in each of these stepping motors are one or more motor coils, as would be well known in the art. Exemplary unidirectional stepping motors are described in U.S. Pat. Nos. 4,550,279, 4,112,671 and 4,912,692 the disclosures of which are incorporated by reference as if fully set forth herein. Such stepping motors require only one motor coil, yet may be able to rotate in both a clockwise and counterclockwise direction. As would be understood in such examples, usually the driving impulse in the coil for a subsequent step in the same rotational direction as the previous step needs to be of an opposite polarity from the previous driving impulse for the previous step. In such a case, two motor coil drivers are needed to drive the one motor coil, where both of these drivers are forming a so-called "H-bridge" with the motor coil, wherein each of the motor coil's wires are connected to one of the two motor coil driver outputs.

On the other hand, a bi-directional stepping motor of the type described in co-pending U.S. patent application Ser. No. 10/090,588, the disclosure of which is also incorporated by reference as if fully set forth herein, requires two motor coils and reference should be made therein for an understanding of its applications and operation.

It has been recognized that advances in stepping motor driver circuitry are desirable. For example, state of the art devices, such as timepieces, having n motor coils, typically require 2n motor coil drivers if the stepping motors associated therewith need alternating driving impulse polarities. Consistent therewith, for each additional motor coil that is added to the particular device, two additional motor coil drivers would be necessary. Thus any additional stepping motors will tend to add more than an insubstantial amount of additional circuitry and power dissipation to a device. It would thus be desirable to reduce the number of needed motor coil drivers to drive a plurality of motor coils used in stepping motors driven devices.

The present invention achieves the foregoing and below mentioned objectives, as well as overcomes the perceived deficiencies in the prior art.

SUMMARY AND OBJECTS OF THE INVENTION

It is therefore an object of the present invention to provide an improved circuit for driving the motor coils of stepping motors that overcomes the foregoing perceived deficiencies.

It is another object of the present invention to provide an improved circuit for driving the motor coils of stepping motors that provides for individualized driving of each motor coil.

It is yet another object of the present invention to provide an improved circuit for driving the motor coils of stepping motors that provides for individual addressing of each motor coil.

It is still another object of the present invention to provide an improved circuit for driving the motor coils of stepping motors that minimizes the number of motor coil drivers needed to drive the plurality of motor coils.

And, it is a further object of the present invention to provide an improved circuit for driving the motor coils of stepping motors that reduces the number of motor coil drivers needed to operate the plurality of stepping motors.

And yet another object of the present invention to provide an improved circuit for driving the motor coils of stepping motors that only requires (n+1) motor coil drivers to drive n motor coils.

It is yet another object of the present invention to provide an improved circuit for supplying both positive and negative driving impulses to n motor coils employing only (n+1) motor coil drivers.

And still another object of the present invention is to provide an improved circuit as described herein that is applicable for both unidirectional and bi-directional stepping motors.

Still other objects and advantages of the invention will in part be obvious and will in part be apparent from the specification.

The invention accordingly comprises the features of construction, combination of elements and arrangement of parts and sequence of steps which will be exemplified in the construction, illustration and description hereinafter set forth, and the scope of the invention will be indicated in the claims.

Generally speaking, in accordance with the present invention, a circuit for selectively driving n motor coils is provided. In a preferred embodiment, each of the n motor coils includes a first terminal and a second terminal, wherein all of the second terminals are coupled to a common line, and the circuit comprises: (n+1) outputs, wherein n of the outputs are individually coupled to a respective first terminal of the n motor coils, and the $(n+1)^{th}$ of which is coupled to the common line; and 2n inputs, n of which are each associated with a respective first input control line for a respective motor coil, and n of which are each associated with a respective second input control line for the respective motor coil; wherein a positive or negative magnetic field can be generated within each of the n motor coils in response to control signals on each of its associated first and second input control lines.

In the preferred embodiment, the circuit also includes a motor driver stage comprising (n+1) motor coil drivers, each of which include an input and an output, wherein the output of n motor coil drivers are individually coupled to a respective first terminal of the n motor coils, the $(n+1)^{th}$ of which is coupled to the common line.

In yet another embodiment, the circuit comprises (n+1) outputs, wherein n of the outputs are individually coupled to a respective first terminal of the n motor coils, and the $(n+1)^{th}$ of which is coupled to the common line; and (n+1) motor coil drivers, each of which include an input and an output, wherein the output of n motor coil drivers are individually coupled to a respective first terminal of the n motor coils, the $(n+)^{th}$ of which is coupled to the common line; (n+1) inputs connected to (n+1) outputs of a microcontroller, wherein n inputs receive control signals from the microcontroller to control the n outputs for the first terminal of the n motor coils, and the $(n+1)^{th}$ input receives the control signal from the microcontroller to the $(n+1)^{th}$ output for the common line with the second terminal of each of the motor coils coupled together, permitting the generation of a positive or negative magnetic field within each of the n motor coils by controlling the signal on the first terminal of each of the respective n motor coils or the common line.

In yet another embodiment, the circuit comprises (n+1) outputs, wherein n of the outputs are individually coupled to a respective first terminal of the n motor coils, and the $(n+1)^{th}$ of which is coupled to the common line; and (n+1) motor coil drivers, each of which include an input and an output, wherein the output of n motor coil drivers are individually coupled to a respective first terminal of the n motor coils, the $(n+1)^{th}$ of which is coupled to the common line; a plurality of logic substages each being coupled to first and second input control lines and an address line input of an address decoder, the address decoder for selectively permitting the generation of positive or negative impulses (i.e. magnetic fields) within each of the n motor coils by controlling the signal on the first terminal of each of the respective n motor coils or of the common line.

In a preferred embodiment, the circuit constructed in accordance with the present invention is incorporated into a timepiece, such as a wristwatch.

BRIEF DESCRIPTION OF THE DRAWINGS

For a fuller understanding of the invention, reference is had to the following description taken in connection with the accompanying figures, in which:

FIG. 2 is a schematic diagram illustrating a circuit for providing positive and negative driving impulses and thus generating positive and negative magnetic fields in the motor coils of stepping motors constructed in accordance with a first embodiment of the present invention, with FIG. 2A illustrating a plurality of the motor coils of FIG. 2, namely motor coils $M_1$–$M_4$ in a first condition, while

Like reference numerals in the various drawings indicate like features and elements, although not every element of each figure may be specifically identified.

DETAILED DESCRIPTION OF THE PREFERRED EMBODIMENTS

Figure 1:
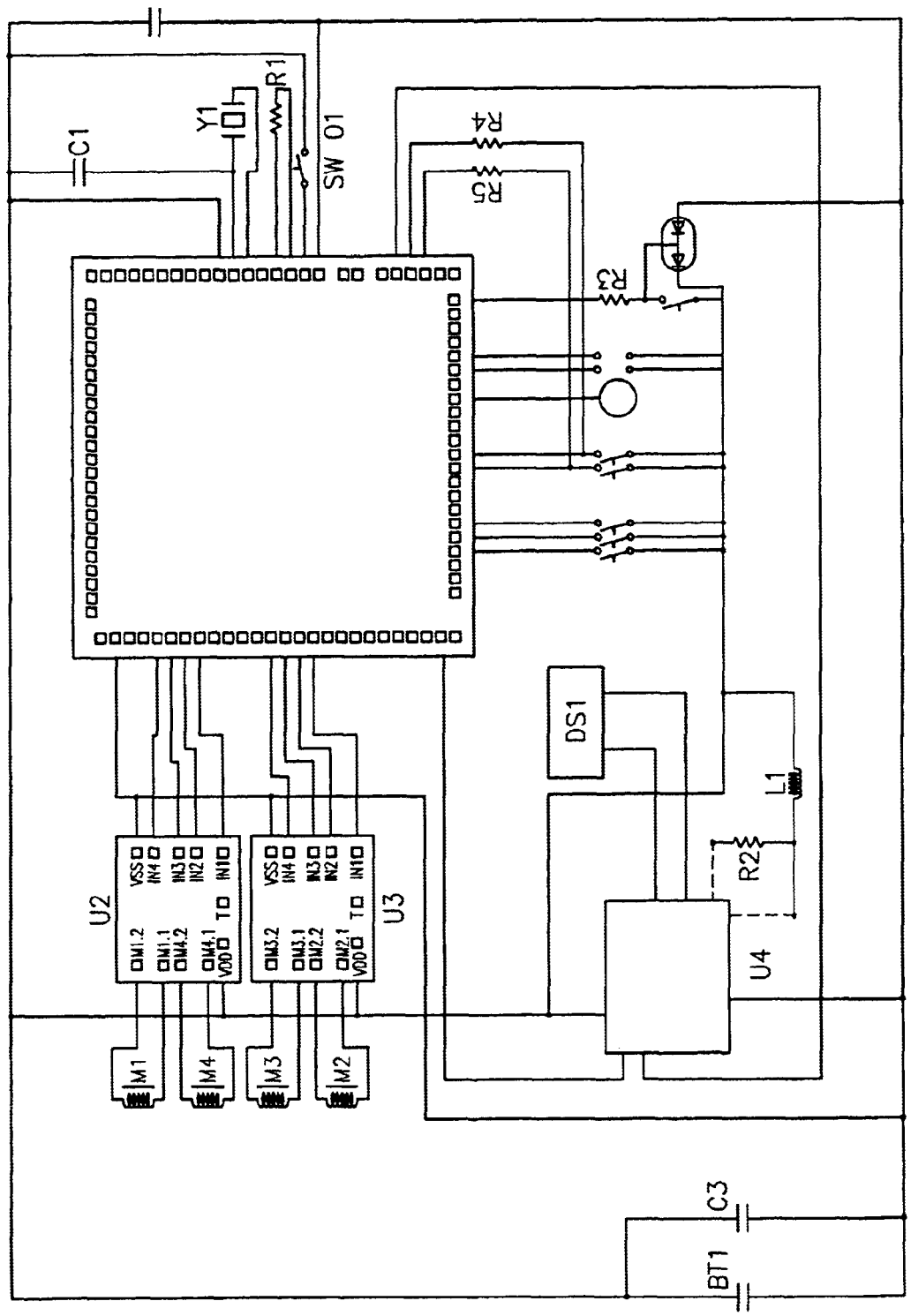
FIG. 1 is an illustration of a circuit for driving the motor coils of stepping motors constructed in accordance with the prior art.

Reference is first made to FIG. 1 wherein a prior art motor driver circuit, generally illustrated at 1, is disclosed. In this embodiment, it can be seen that a microprocessor, such as a EPSON E0C60A08, controls eight motor coil drivers, which in turn provide positive and negative driving impulses to four motor coils M1, M2, M3 and M4. As such, to control a plurality of stepping motors (not shown), it can be seen that the prior art requires 2n motor coil drivers for every n motor coils.

Figure 2:
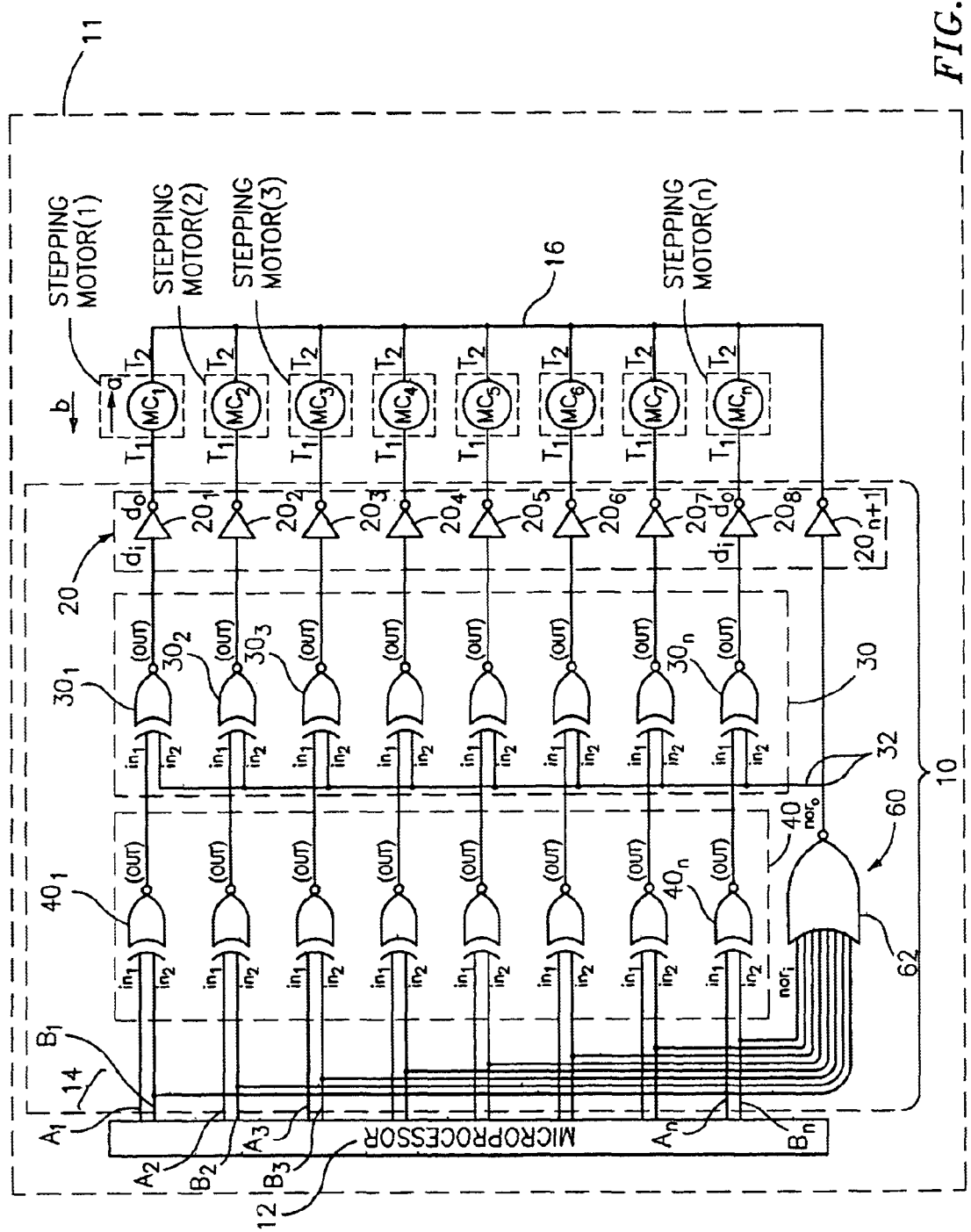

Reference is now made to FIG. 2 wherein a circuit generally illustrated at 10, for driving the motor coils of stepping motors, constructed and arranged in accordance with a first embodiment of the present invention, is disclosed. In a preferred embodiment, and generally speaking, the circuit (hereinafter "circuit 10") for driving the motor coils of stepping motors selectively drives a plurality of motor coils in response to certain first and second signals on input control lines A and B associated with each respective motor coil. These control signals are generated and controlled by a microprocessor 12. Microprocessor 12 may be a EPSON E0C60A08 for example.

Circuit 10 is constructed and arranged to be able to provide positive and negative driving impulses to any number of motor coils and hence any number of stepping motors. In the disclosed example of FIG. 2, the number of motor coils is eight, and the number of stepping motors (illustrated as dotted lines of FIG. 2) is eight, as it is assumed that each stepping motor only requires one motor coil. However, this is clearly by example and not limitation, since the number of motor coils (and stepping motors) is only limited by the needs, constraints and objectives of the particular device within which the present invention is incorporated. Therefore, in order to generally disclose the construction and advantages of the present invention, the number of motor coils shall be generically designated as n. In the case where two or more motor coils are associated with each stepping motor, each stepping motor is preferably, but not necessarily, as described in copending U.S. patent application Ser. No. 10/090,588. However, the stepping motors may be unidirectional or bi-directional as would be understood from the teachings herein and the knowledge of one skilled in the art.

Each of the motor coils, designated $MC_1$–$MC_n$, has associated therewith a respective first input control line $A_n$ and a second input control line $B_n$ as noted above, as well as a first terminal $T_1$ and a second terminal $T_2$.

Generally speaking, circuit 10 comprises (n+1) outputs, wherein n of the outputs are individually coupled to a respective first terminal $T_1$ of each motor coil, and an $(n+1)^{th}$ output is coupled or otherwise connected to a common line 16, to which each second terminal $T_2$ of each of the n motor coils is coupled or otherwise connected.

Circuit 10 also includes 2n inputs, n of which are each associated with each respective first input control line A; and n of which are each associated with each respective second input control line B.

Circuit 10 comprises an inverter-driver stage, generally indicated at 20, intermediate the motor coil control lines $A_n$ and $B_n$ and the motor coils themselves, wherein the driver stage comprises (n+1) drivers ($20_1$–$20_{n+1}$). Each driver includes an input ($d_i$) and an output ($d_o$), wherein the respective outputs of drivers $20_1$–$20_n$ are individually coupled to a respective first terminal $T_1$ of motor coils $MC_1$–$MC_n$. For example, the output ($d_o$) of driver $20_1$ is coupled to terminal $T_1$ of motor coil $MC_n$ and the output ($d_o$) of driver $20_n$ is coupled to terminal $T_1$ of motor coil $MC_n$. The $(n+1)^{th}$ driver, namely driver $20_{n+1}1$, has its output ($d_o$) coupled or otherwise connected to each terminal $T_2$ of motor coils $MC_1$–$MC_n$ (i.e. to common line 16).

Circuit 10 also comprises a plurality of logic stages positioned intermediate the input control lines $A_n$, $B_n$ and inverter-driver stage 20. Describing these logic stages as comprising a plurality of stages is done merely for convenience. That is, the entire logic arrangement could be described as one stage, and putting any one element in a particular stage is merely for ease of description and not limitation.

First stage 30 comprises n exclusive-nor gates $30_1$–$30_n$, each of which includes an output (out) that is individually coupled to a respective input ($d_i$) of the n drivers whose outputs, as disclosed above, are individually coupled to the respective first terminal $T_1$ of the n motor coils. For example, the output (out) of gate $30_1$ is coupled to the input ($d_i$) of inverter-driver $20_1$, and the output (out) of gate $30_n$ is coupled to the input ($d_i$) of inverter-driver $20_n$. Each of the n exclusive-nor gates $30_1$–$30_n$ also includes a first input ($in_1$) and a second input ($in_2$), wherein the second input ($in_2$) of all exclusive-nor gates $30_1$–$30_n$ are coupled or otherwise all electrically connected together (i.e. to a common line 32).

Second stage 40 preferably also comprises n exclusive-nor gates, indicated as gates $40_1$–$40_n$, each of which includes an output (out) that is individually coupled to the respective first input ($in_1$) of the n exclusive-nor gates $30_1$–$30_n$ of first stage 30. For example, the output (out) of gate $40_1$ is coupled to the first input ($in_1$) of exclusive-nor gate $30_1$, and the output (out) of gate $40_n$ is coupled to the first input ($in_1$) of exclusive-nor gate $30_n$. Each of the n exclusive-nor gates $40_1$–$40_n$ also includes a first input ($in_1$) to which is coupled or otherwise connected motor input control line $A_n$ for a selected motor coil $MC_n$, and a second input ($in_2$) to which is coupled or otherwise connected the motor input control line $B_n$ for that selected motor coil $MC_n$. For example, motor input control line $A_1$, associated with and for controlling motor coil $MC_1$ is coupled or otherwise connected to the first input ($in_1$) of gate $40_1$ and motor input control line $B_1$, also associated with and for controlling motor coil $MC_1$ is coupled or otherwise connected to the second input ($in_2$) of gate $40_1$.

Lastly, third stage 60 preferably comprises a NOR gate 62 comprising an output ($nor_o$) and n inputs wherein each of the n inputs of NOR gate 62 is coupled or otherwise respectively connected to each of the n motor control lines $B_n$. The output ($nor_o$) of NOR gate 62 is connected to the second input ($in_2$) of each exclusive nor gate $30_1$–$30_n$ (i.e. common line 32) and the input of driver $20_{n+1}$ whose output is electrically coupled to each motor terminal $T_2$ of the n motor coils $MC_1$–$MC_n$.

Figure 2A:
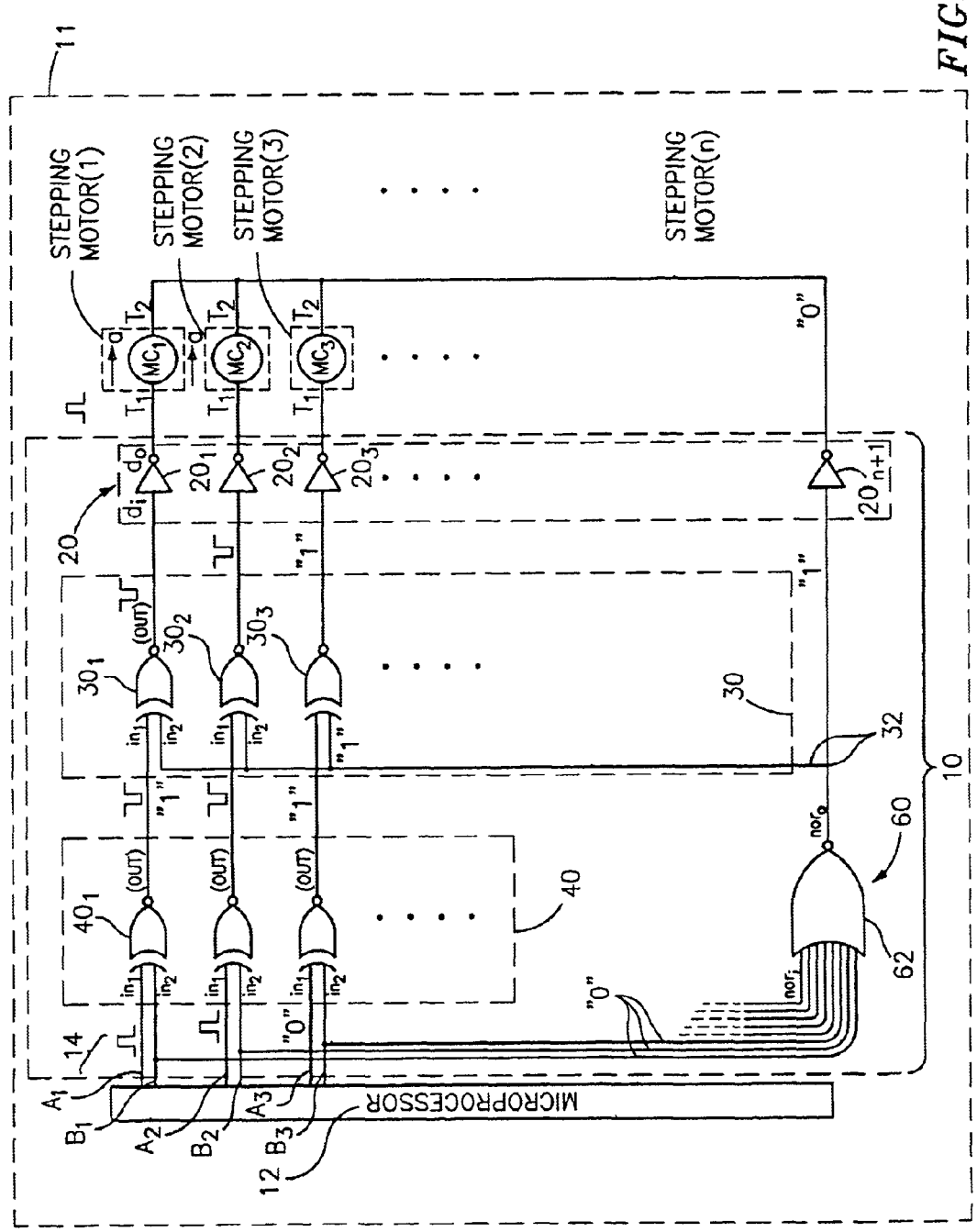
Figure 2B:
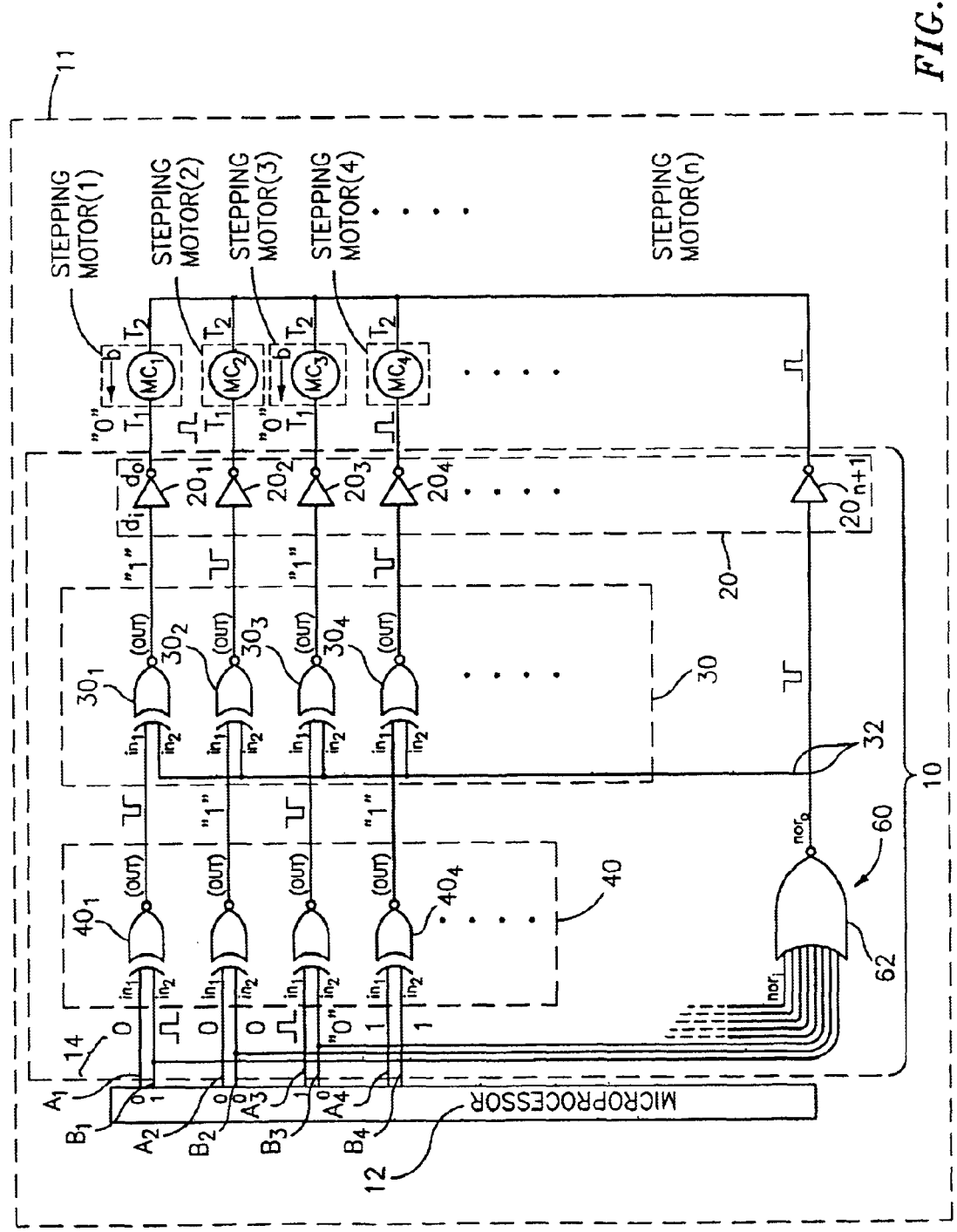
FIG. 2B illustrates a plurality of the motor coils, namely motor coils $M_1$–$M_4$ in a second condition.

The operation of this first embodiment will first be described with the aid of FIG. 2A wherein motors $MC_1$, $MC_2$ and $MC_3$ are shown. FIG. 2A provides the logic levels and motor drive levels for a condition where a "0" logic level is present on all terminals $T_2$. As will be understood by one familiar with the art, there is no loss of generality by showing only motor coils $MC_1$, $MC_2$ and $MC_3$ as the logic is easily extended to any number of motor coils. Next, reference will be made to FIG. 2B showing motors $MC_1$, $MC_2$, $MC_3$ and $MC_4$ (for exemplary purposes) but in this FIG. 2B a logic level "1" is present on all terminals $T_2$.

For an understanding of the operation of the embodiments disclosed herein, certain conventions are hereby established. When a terminal $T_1$ (or Tn.1) of a motor coil ($MC_1$ for example) is pulsed between a low level and a high level (i.e. between substantially zero volts to substantially 3 volt, for example) and terminal $T_2$ (or Tn.2) of that motor coil (i.e. motor coil $MC_1$ in this example) is held at a low level (i.e. substantially 0 volts), the convention will be that the stepping motor coil associated therewith will receive a positive driving impulse (designated merely for convenience and not limitation to be in the direction indicated by arrow "a"). Similarly, when terminal $T_2$ of a motor coil (i.e. $MC_1$) is pulsed between a low level and a high level and terminal $T_1$ of that motor coil is held at a low level (FIG. 2B), the convention will be that the stepping motor coil associated therewith will receive a negative driving impulse (also designated merely for convenience and not limitation to be in the direction of arrow "b").

The description that follows for the remainder of the application will not indicate that a terminal $T_1$ or $T_2$ is pulsed but rather will indicate whether the terminals $T_1$ or $T_2$ of a motor coil are at the same or different logic level, as it will be understood by one familiar with the art that when the logic levels of terminals ($T_1$(or Tn.1), $T_2$ (or Tn.2)) of a motor coil are different, at least one of the terminals is pulsed to establish the difference. For example, when a terminal $T_1$ of a motor coil is pulsed between a low level and a high level and terminal $T_2$ of that motor coil is held at a low level, it is established by this convention that the stepping motor coil will receive a positive driving impulse and will hereafter be written in an analogous fashion to "When terminal $T_1$ of motor coil $MC_1$ is at a high level and terminal $T_2$ of motor coil $MC_1$ is held at a low level, the motor coil $MC_1$ receives a positive driving impulse." The opposite is true for the negative driving impulse. Further when substantially the same voltage levels appear simultaneously on both terminals $T_1$ and $T_2$ of a motor coil, the stepping motor associated with that motor coil will not be urged to rotate in any direction.

Lastly, exclusive-nor gates $30_1$–$30_n$ and $40_1$–$40_n$ of this first embodiment and the exclusive-nor gates of the second embodiment function as follows: when inputs ($in_1$) and ($in_2$) of a gate are the same, its output is a logic "1" and when its inputs are different the output of the gate is a logic "0". NOR gate 62 functions in a typical manner whereby any input terminal at a logic "1" level will cause the output ($nor_o$) to be a logic "0" and all inputs must be a logic "0" for the output to be a "1".

Positive or No Driving Impulse

Referring now to FIG. 2A it is seen that a positive driving impulse to a stepping motor associated with $MC_1$ by way of example, requires that terminal $T_2$ of motor coil $MC_1$ must be at a low level when terminal $T_1$ thereof is at a high level. Since in the preferred embodiment all the motor terminals $T_2$ are connected to common line 16, all terminals $T_2$ for all motor coils are at a low level. For common line 16 to be at a low level, the input to inverting-driver $20_{n+1}$ must be a logic "1" and thus, each of the inputs of NOR gate 62 must be logic "0".

For terminal $T_1$ of motor coil $MC_1$ to be at a high level, the output of gate $30_1$ must be at a low logic level. Since the output ($nor_o$) of NOR gate 62 must be a logic "1" for the common line 16 to be low, input ($in_2$) of gate $30_1$ is also a logic "1". Since the output of logic gate $30_1$ can only be a "0" if inputs ($in_1$) and ($in_2$) thereof are different, then input ($in_1$) must be a logic "0". For input ($in_1$) of gate $30_1$ to be a logic "0", the control signals on motor control input lines $A_1$ and $B_1$ must be different. Since all control signals on motor control input lines $B_1$–$B_n$ must be a logic "0" (to make the output ($nor_o$) a logic "1"), only a logic "1" on a control line $A_1$ will cause a positive driving impulse at motor coil $MC_1$. Thus, it can be seen that a logic "1" on an input control line $A_n$ will cause a positive driving impulse at the nth motor coil; that is, a "1" input on $A_2$ will cause a positive driving impulse at motor coil $MC_2$.

A similar analysis will demonstrate that when a logic "0" is on the motor input control line $A_3$ (i.e. both $A_3$ and $B_3$ have logic "0") both $T_1$ and $T_2$ of motor coil $MC_3$ will be the same level and no driving impulse will occur.

Thus it can be seen, with the logic configuration set forth above, that each motor coil and thus each stepping motor can be individually driven, controlled and otherwise addressed such that, through a proper signaling on the respective input lines A, B associated with each motor coil, the stepping motor coils associated therewith can be individually and selectively supplied with a positive driving impulse.

Negative or No Driving Impulse

Referring now to FIG. 2B, for negative driving impulse generation, common line 16 would be at a high level, and thus the input to driver $20_{n+1}$ would need to be a logic "0." FIG. 2B illustrates motor coils $MC_1$–$MC_4$ and the corresponding components of circuit 10. For the input to driver $20_{n+1}$ to be a logic "0", at least one control signal on one of the motor input control lines $B_1$–$B_n$ must be a logic "1" so as to cause the output (nor$_o$) of gate 62 to be a logic "0." For purposes of illustration, it is assumed that the control signal on line $B_1$ is a logic "1".

The output of gate 62 is inputted to input (in$_2$) of all gates $30_1$–$30_n$, including gate $30_1$, and a negative driving impulse at motor coil $MC_1$ requires that terminal $T_1$ of motor coil $MC_1$ must be at a low level, and thus the output (out) of gate $30_1$ must be logic "1". Because the output (nor$_o$) of gate 62 is a logic "0" (see above), input (in$_1$) of gate $30_1$ must be a logic "0" (both (in$_1$) and (in$_2$) of gate $30_1$ must be the same). For the input (in$_1$) of gate $30_1$ to be a logic "0", the output of gate $40_1$ must be a logic "0" and therefore, the control signals on control lines $A_1$ and $B_n$ must be different. Since it was assumed that the control signal on input line $B_1$ is a logic "1", it is concluded that a logic "0" at input $A_1$ will cause a negative driving impulse at the motor coil $MC_1$.

As seen in FIG. 2B, with input $B_n$ at a logic "1", the polarities at the motor coils $MC_1$–$MC_4$ are given as follows:

TABLE I

| Motor Coil | Motor Line Signal | | Motor terminals | | Driving Impulse |
|---|---|---|---|---|---|
| | $B_n$ | $A_n$ | $T_1$ | $T_2$ | |
| $MC_1$ | 1 | 0 | Low | High | Negative |
| $MC_2$ | 0 | 0 | High | High | None |
| $MC_3$ | 0 | 1 | Low | High | Negative |
| $MC_4$ | 1 | 1 | High | High | None |

Thus it can be seen, with the logic configuration set forth above, that each motor coil and thus each stepping motor can be individually driven, controlled and otherwise selected such that, through a proper signaling on the respective input lines A, B associated with each motor coil, the stepping motors associated therewith can be individually and selectively supplied with negative driving impulses or no driving impulses.

Also, as indicated above, at least one of the control signals on at least one of the B input lines must be a logic 1, and if desired, more or all of the control signals on all of the input control lines $B_1$–$B_n$ may be caused to be a logic 1.

Figure 3:
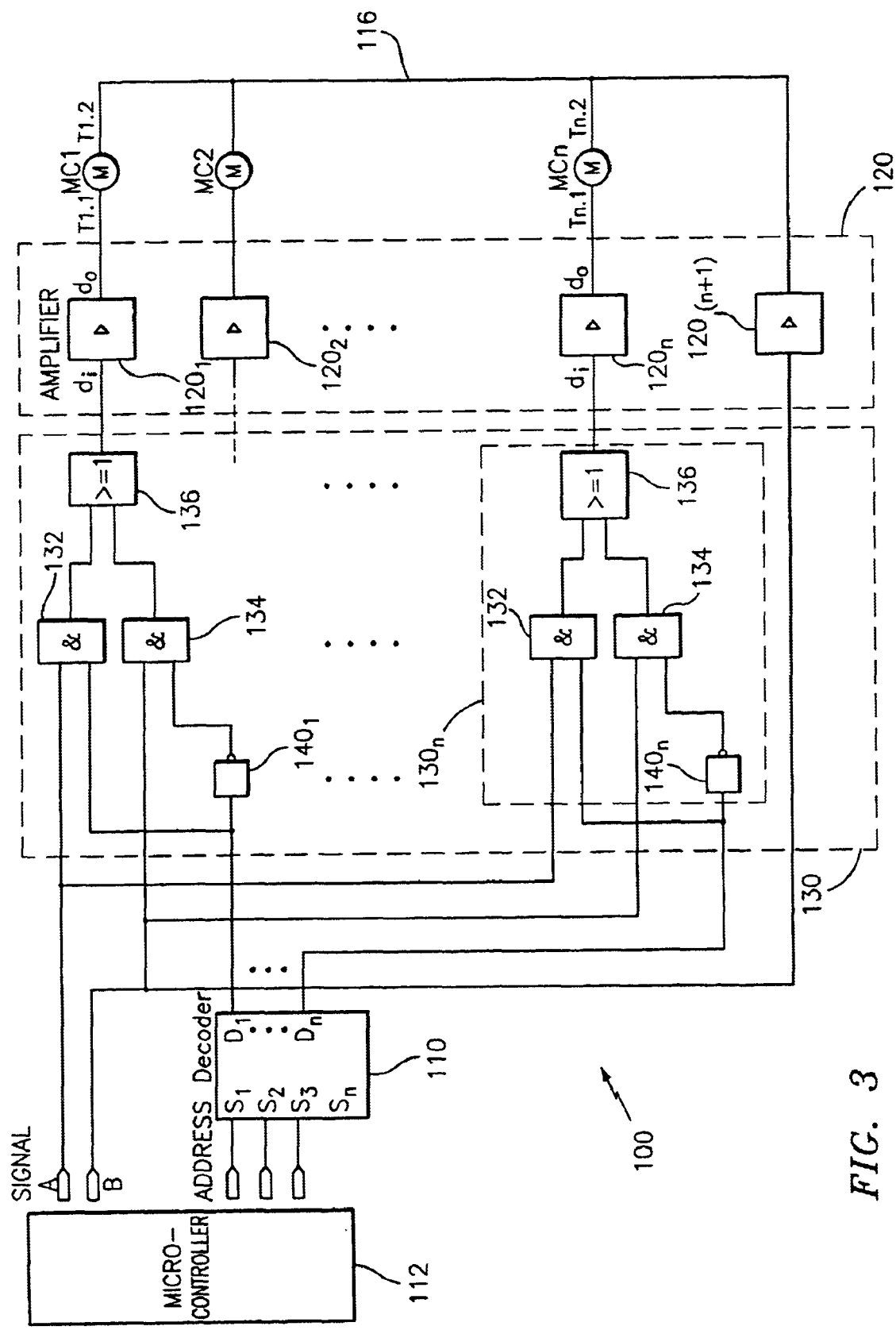
FIG. 3 is a schematic diagram illustrating a circuit for providing positive and negative driving impulses to the motor coils of stepping motors constructed in accordance with a second embodiment of the present invention.

Reference is now made to FIG. 3 for a disclosure of the present invention constructed in accordance with a second embodiment of the present invention. It should be understood that the advantages enumerated above, including that a plurality of motor coils, such as but not limited to, eight in the present example, can be selectively addressed so as to be supplied with positive and negative driving impulses using only n+1 motor coil drivers, where n represents the number of motor coils used in connection with a plurality of stepping motors. For purposes of illustration, FIG. 3 is deemed to illustrate eight motor coils $MC_1$–$MC_8$, with motor coil $M_8$ being designated $M_n$. Again, it should be understood that each stepping motor may need only one motor coil (as exemplified in FIG. 3 and described in one or more of the patents incorporated by reference herein), or each stepping motor may be configured as in U.S. application Ser. No. 10/090,588, where two coils are needed for each stepping motor. FIG. 3 should be understood to cover at least both configurations.

FIG. 3 discloses a motor coil driver circuit, generally illustrated at 100, constructed and arranged in accordance with this second embodiment. Like circuit 10, motor coil driver circuit 100 (hereinafter "circuit 100") selectively drives a plurality of stepping motors by providing certain driving impulses with alternating polarity to a plurality of motor coils in response to signals on certain first and second input control lines A, B.

Again, each of the motor coils, designated $MC_1$–$MC_n$, have a respective first input terminal Tn.1 and a second input terminal Tn.2. As can be seen, all the second terminals T1.2–Tn.2 are coupled or otherwise electrically connected to a common line 116. Circuit 100 comprises (n+1) outputs, wherein n of the outputs are individually coupled to a respective first terminal Tn.1 of the n motor coils, and the $(n+1)^{th}$ of which is coupled or otherwise electrically connected to common line 116. As few as two motor input control lines A, B for the entire circuit 100 are needed, since the selectivity and providing of a certain driving impulse to a particular motor coil is achieved by an addressing scheme, as will be disclosed below.

Circuit 100 preferably comprises a driver stage, generally indicated at 120, intermediate input control lines A, B and motor coils $MC_1$–$MC_n$, wherein the driver stage comprises (n+1) drivers ($120_1$–$120_{n+1}$), each of which include an input ($d_i$) and an output ($d_o$), wherein the respective outputs of drivers $120_1$–$120_n$ are individually coupled to a respective first terminal Tn.1 of motor coils $MC_1$–$MC_n$. Again, the $(n+1)^{th}$ driver, namely driver $120_{n+1}$, has its output ($d_o$) coupled to or otherwise connected to all of the second terminals Tn.2 of motor coils $MC_1$–$MC_n$ (i.e. to common line 116).

Circuit 100 also comprises a logic stage, generally indicated at 130, positioned intermediate the input control lines A, B and driver stage 120. In a preferred embodiment, logic stage 130 comprises n identical substages $130_n$, with only one being referenced in detail for purposes of brevity. Specifically, each substage $130_1$ includes two AND gates 132, 134 and an OR gate 136 configured as set forth in FIG. 3. Specifically, the output of both AND gates comprise the inputs to OR gate 136 for the particular substage $130_n$. The output of each OR gate 136 in each substage is coupled to the input ($d_i$) of its respective driver $120_n$. The inputs to each respective AND gate 132 comprises the control line A and an address line $D_n$ of an address decoder 110. The inputs to each respective AND gate 134 comprises control line B and the same address line $D_n$ of address decoder 110 except that the signal from address line $D_n$ is coupled through an inverter $140_n$.

The number of desired inputs for address decoder 110 is within the skill of the artisan. The preferred determination is achieved by the equation ROUNDUP (1d(n)), where 1d(n)= log(n)/log(2)), where n is the number of motor coils. This formulation provides for individually and selectively addressing and thus providing the appropriate driving impulses to each of the motor coils $MC_1$–$MC_n$. As would be understood, the number of inputs to decoder 110 can also conform to the equation ROUND (1d(n)+0.5) if it is desired that there should be no motor coil addressing when all zeros are present on the address lines. This addressing scheme would be well understood in the art, but for purposes of completeness, one further convention is preferred with the logic configuration set forth herein; namely, that to select a particular motor coil, it is preferred that a logic high (i.e. "1") pulse is placed on the respective address line $D_n$ of its associated substage $130_n$. Of course other conventions and pulsing approaches could be established while remaining within the scope of the invention. That is, if it is desired to select and provide a particular driving impulse on a stepping motor coil $MC_n$, a logic "1" should be placed on the respective address line $D_n$ for that substage $130_n$. The remaining conventions set forth above apply to this embodiment as well.

To understand the operation of the present invention, reference should first be had to Table II below, illustrating the logic levels of the signals on input control lines A, B; the signal on the particular address line "$D_n$" for a particular substage $130_n$ and the resulting logic levels on the terminals Tn.1 and Tn.2 of the motor coils associated therewith. The convention that is preferred is that if Tn.1 is a logic 1 and its associated Tn.2 is a logic 0, then the driving impulse is deemed to be positive. On the other hand, if Tn.1 is a logic 0 and its associated Tn.2 is a logic 1, then the driving impulse is deemed to be in the opposite direction, namely negative.

TABLE II

| D1 | Dn | A | B | T1.1 | T1.2 | Tn.1 | Tn.2 |
|----|----|----|----|------|------|------|------|
| 0  | 1  | 0  | 0  | 0    | 0    | 0    | 0    |
| 0  | 1  | 1  | 0  | 0    | 0    | 1    | 0    |
| 0  | 1  | 0  | 1  | 1    | 1    | 0    | 1    |
| 0  | 1  | 1  | 1  | 1    | 1    | 1    | 1    |

From a review of Table II, it can be seen that a logic "0" on an address line $D_n$ for a particular substage $130_n$ will cause the same logic levels to appear on both terminals T1.1 and T.2.2 (or more generically speaking Tn.1 and Tn.2), thus providing creating no magnetic field within the particular motor coil. However, it can be seen that the logic levels for Tn.1 and Tn.2 follow that of the control signals A, B when there is a logic "1" on $D_n$. Thus by designated convention, a signal combination of 1, 0 on control lines A, B provide a positive driving impulse in a motor coil while the combination of 0, 1 on control lines A, B provide a negative driving impulse to the motor coil. Consistent with the conventions set forth above, input combinations for lines A, B respectively being 0, 0 and 1, 1 will not generate any appreciable magnetic field within the respective motor coil, all as would be understood in the art from an understanding of the first embodiment above and disclosed in the aforementioned copending U.S. patent application Ser. No. 10/090,588.

Therefore, it can be seen that the foregoing circuit 100 provides for individual and selective providing of driving impulses with both negative and positive polarities to motor coils $MC_1$–$MC_n$, and hence for control of the rotation of the stepping motors associated therewith. Specifically, the generation of positive and negative driving impulses and selectively rotating of one or more stepping motors can be controlled by the novel motor coil addressing scheme disclosed above.

Figure 4:
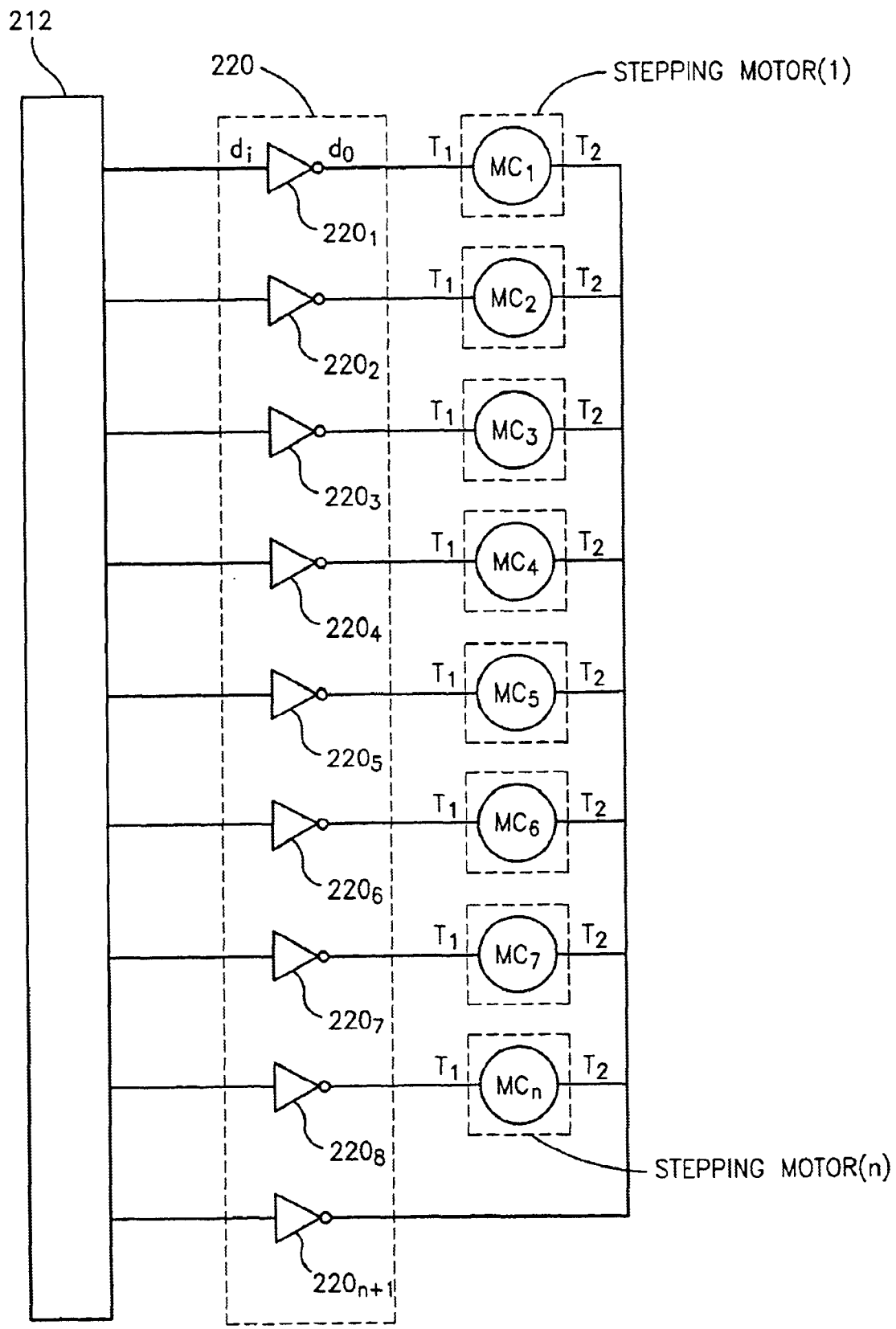
FIG. 4 is yet another embodiment illustrating a circuit for providing positive and negative driving impulses to motor coils as set forth in greater detail below, all in accordance with the present invention.

Lastly, reference is made to FIG. 4 for a brief disclosure of yet a further embodiment of the present invention. While this embodiment is similar to that disclosed above with respect to FIGS. 2, 2A and 2B, here, each of the (n+1) inputs of the (n+1) motor coil drivers $220_n$ are directly driven by a microcontroller 212 or an ASIC. Here the microcontroller would desirably generate the same input signals for the (n+1) motor coil drivers as those generated by the logic stages set forth above. This embodiment is advantageous in the event the microcontroller or the ASIC can be appropriately configured to generate the correct signals to directly drive the (n+1) motor coil drivers for the n coils, while the embodiment described above with respect to FIG. 2 may be advantageous in the event, for example and not limitation, that one desires to retrofit existing microcontrollers to be used in connection with the present invention.

It can thus be seen that a motor coil driving circuit constructed in accordance with the present invention provides significant and desirable advantages over those found in the prior art. For example, it can now be seen that the present invention provides an improved circuit for driving the motor coils of stepping motors that overcomes the foregoing perceived deficiencies. It can also be seen that the present invention provides an improved circuit for driving the motor coils of stepping motors that provides for individualized driving of each motor coil. Further, the present invention provides an improved circuit for driving the motor coils of stepping motors that provides for individual addressing of each motor coil. Still further, the present invention minimizes the number of motor coil drivers needed to drive the plurality of motor coils and thus reduces the number of motor coil drivers needed to operate the plurality of stepping motors. Yet further, the present invention only requires (n+1) motor coil drivers to drive n motor coils. And still further, the present invention is applicable for both unidirectional and bi-directional stepping motors.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

For example, the present invention has been set forth disclosing particular logic stage arrangements. These arrangements however are only for illustrative purposes. For example, it is envisioned that modifications could be made in the logic sequences while staying within the scope of the present invention. In particular, "nor" gates could be used in place of "or" gates, and visa versa. This disclosure should be deemed to disclose both and the logic gates and control signals therefore would be well within the scope of one skilled in the art with the foregoing description available. Likewise, the opposite signals on the input control lines could produce the same results as those set forth above if the conventions assumed are reversed. That is, for example, where in circuit 10 the combination 0, 1 on the input control lines provides for a negative driving impulse polarity, the inputs 1, 0 could be used if the assumed convention is reversed. Likewise, a different logic stage for circuit 100 could provide for a "1" on the address line $D_n$ to disable the generation of a driving impulse to the motor coil. All of such modifications are well within the knowledge of one skilled in the art and covered by the claims herein. Furthermore, references to "connected" and "coupled" should be understood to be interchangeable such that the mere introduction of a component would not alter the intent of the specification or claims, if such introduction would be understood or thought of by one skilled in the art. Moreover, the use of the term "intermediate" is for convenience only and not limitation. Lastly, other embodiments to provide the control signals other than a microprocessor could be used, all of which would be understood in the art.

Finally, it should be well appreciated that the present invention is well suited for a wide variety of devices, such as timepieces that utilize analog movements. Examples of such timepieces are described in U.S. Pat. Nos. 4,744,066; 4,888,749; 5,059,840; 4,888,507; and 4,886,988, the disclosures all of which are incorporated by reference as if fully set forth herein. Accordingly, a timepiece that would include a motor driver circuit as disclosed and claimed herein, and one including one or more stepping motors as illustrated and disclosed herein, is well within the contemplated uses of the present invention. Moreover, such a timepiece is well enabled by the disclosure set forth herein and those patents incorporated herein by reference. However, it should be clear that any electronic device that could utilize the present invention is intended to be covered hereby. Accordingly, any electronic device, such as that indicated by reference number 11 in FIG. 2, and including a timepiece, that can utilize the present invention, is clearly within the scope herein. That is, the timepieces that are described in the patents set forth above in combination with the figures and corresponding description clearly enable and fully disclose a timepiece incorporating the present invention.

It should also be clear that the generation or otherwise providing of positive and negative driving impulses may be used interchangeably with, and should be understood to be synonymous with generating magnetic fields of opposite polarity, both of which will cause the stepping motors' rotors to rotate in one or both of a clockwise and/or counterclockwise direction, all as would be understood by one skilled in the art and disclosed in the patents set forth herein.

What is claimed is:

1. A circuit for selectively driving n motor coils, wherein n is an integer greater than 0, wherein each of n motor coils includes a first terminal and a second terminal and a second terminal, wherein all of the second terminals are coupled to a common line, the circuit comprising:
   n+1 outputs, wherein n of the outputs are individually coupled to a respective first terminal of the n motor coils, and the $(n+1)^{th}$ of which is coupled to the common line;
   2 inputs, n of which are each associated with a respective first input control line for a respective motor coil, and n of which are each associated with a respective second input control line for the respective motor coil;
   (n+1) motor coil drivers, each of which include an input and an output, wherein the output of n motor coil drivers are individually coupled to a respective first terminal of the n motor coils, the $(n+1)^{th}$ of which is coupled to the common line; and
   a logic circuit having as inputs control signals from the n second input control lines and an output to which is coupled the input of the $(n+1)^{th}$ motor coil driver;
   wherein both a positive and a negative magnetic field can be generated within each of the n motor coils in response to control signals on each of its associated first and second input control lines.

2. The circuit as claimed in claim 1, including a logic stage comprising:
   a first stage comprising:
      n exclusive-nor gates, wherein n is an integer greater than 0, each of which includes an output that is individually coupled to a respective input of the n motor coil drivers whose outputs are individually coupled to the first terminal of the n motor coils, a first input and a second input; wherein the second inputs of each exclusive-nor gate is coupled to a common line; and
   a second stage comprising:
      n exclusive-nor gates, each of which includes an output that is individually coupled to a respective first input of the n exclusive-nor gates of the first stage, a first input to which is coupled the first input control line for a respective motor coil, and a second input;
   wherein the logic circuit comprises:
      a nor gate the output of which is connected to the second input of each of the exclusive nor gates of the first stage.

3. A timepiece comprising a circuit for selectively driving in motor coils, wherein n is an integer greater than 0, wherein each of n motor coils includes a first terminal and a second terminal, wherein all of the second terminals are coupled to a common line, the circuit comprising:
   (n+1) motor coil drivers, each of which include an input and an output, wherein the output of n motor coil drivers are individually coupled to a respective first terminal of the n motor coils, the $(n+1)^{th}$ of which is coupled to the common line;
   a logic stage comprising 2n inputs, it of which are each associated with a respective first input control line for each respective motor coil, and it of which are each associated with a respective second input control line for each respective motor coil, the logic stage for providing individual control of the generation of magnetic fields in one or more of the n motor coils; and
   a logic circuit having as inputs control signals from the n second input control lines and an output to which is coupled the input of the $(n+1)^{th}$ motor coil driver;
   wherein both a positive and a negative magnetic field can be generated within each of the n motor coils in response to control signals on the first and second input control lines of each respective motor coil.

4. The timepiece as claimed in claim 3, wherein the logic stage comprises:
   a first stage comprising n first gates, wherein n is an integer greater than 0, each of the n first gates comprising:
      an output that is individually coupled to a respective input of the n motor coil drivers whose outputs are individually coupled to the first terminals of the n motor coils;
      a first input; and
      a second input,
   a second stage comprising a plurality of n second gates, wherein n is an integer greater than 0, each of the n second gates comprising:
      an output that is individually coupled to a respective first input of the n first gates of the first stage;
      a first input to which is coupled the first input control line for a respective motor coil, and
      a second input to which is coupled the second input control line for the respective motor coil;
   wherein the output of the logic circuit is connected to the second input of each of the n first gates of the first stage and the input of the motor coil driver whose output is coupled to the common line.

5. The timepiece as claimed in claim 4, wherein each of the first gates are exclusive-nor gates, each of the second gates are exclusive-nor gates and the logic circuit comprises a nor gate.

6. The timepiece as claimed in claim 4, wherein each of the first gates are exclusive-or gates and each of the second gates are exclusive-or gates.

7. The timepiece as claimed in claim 3, comprising a microprocessor for controlling the generation of the magnetic fields inside one or more of the motor coils by providing control signals on the first input control line and the second input control line.

8. The timepiece as claimed in claim 3, including a plurality of stepping motors, each of which is associated with at least one of the n motor coils.

9. A circuit for selectively driving n motor coils in response to first and second input control signals, wherein n is an integer greater than 0, wherein each of the n motor coils includes a first terminal and a second terminal, wherein all of the second terminals are coupled to a common line, the circuit comprising:

(n+1) motor coil drivers, each of which include an input and an output, wherein the output of n motor coil drivers are individually coupled to a respective first terminal of the n motor coils, the $(n+1)^{th}$ of which is coupled to the common line;

an address decoder for selectively permitting the generation of a magnetic field within each of the n motor coils by controlling the signal on the first terminal of each of the respective n motor coils; and a logic stage comprising:
  a plurality of substages, each substage comprising:
    a plurality of inputs each of which are individually coupled to the first input control line, the second input control line and an address line input of the address decoder; and
    an output that is coupled to a respective input of one of the n motor coil drivers; and
  wherein the input of the $(n+1)^{th}$ motor driver coil is coupled to the second input control line.

10. The circuit as claimed in claim 9, wherein each substage comprises at least two logic AND gates and a logic OR gate and wherein:

the first AND gate has a first input coupled to the first input control line and a second input coupled to the address line input of the address decoder;

the second AND gate has a first input coupled to the second input control line and a second input coupled to the same address line input as the first AND gate via an inverter;

the outputs of both AND gates are provided as inputs to the OR gate; and wherein the output of the OR gate is coupled to a respective input of one of the n motor coil drivers.

11. The circuit as claimed in claim 9, wherein each of the logic substages are exclusive-nor gates.

12. The circuit as claimed in claim 9, including n substages, each associated with one of the n motor coils.

13. A timepiece comprising a motor coil driver circuit as claimed in claim 9, including a plurality of unidirectional or bi-directional stepping motors, each stepping motor being associated with at least one motor coil.

14. The timepiece as claimed in claim 9, comprising a microprocessor for providing control signals on the first input control line and the second input control line.

15. A circuit for selectively driving n motor coils, wherein n is an integer greater than 0, wherein each of n motor coils includes a first terminal and a second terminal, wherein all of the second terminals are coupled to a common line, the circuit comprising:

(n+1) motor coil drivers, each of which include an input and an output, wherein the output of n motor coil drivers are individually coupled to a respective first terminal of the n motor coils, the $(n+1)^{th}$ of which is coupled to the common line;

a microcontroller including (n+1) outputs, n of which are individually coupled to the respective input of the n motor coil drivers, and the $(n+1)^{th}$ of which is coupled to the input of the $(n+1)^{th}$ motor coil driver;

wherein both a positive and a negative magnetic field can be generated within each of the n motor coils in response to signals on its respective first and second terminals.

16. A timepiece comprising a motor coil driver circuit as claimed in claim 15, including a plurality of unidirectional or bi-directional stepping motors, each stepping motor being associated with at least one motor coil.

* * * * *

UNITED STATES PATENT AND TRADEMARK OFFICE
CERTIFICATE OF CORRECTION

PATENT NO. : 6,914,855 B2
DATED : July 5, 2005
INVENTOR(S) : Gerhard Stotz et al.

It is certified that error appears in the above-identified patent and that said Letters Patent is hereby corrected as shown below:

Column 11,
Line 37, delete "n+1" and replace it with -- (n+1) --.
Line 41, delete "2inputs," and replace it with -- 2n inputs, --.

Column 12,
Line 12, delete "in motor" and replace it with -- n motor --.
Line 21, delete "it" between "inputs," and "of" and replace it with -- n --.
Line 23, delete "it" between "and" and "of" and replace it with -- n --.

Signed and Sealed this

Sixth Day of September, 2005

JON W. DUDAS
*Director of the United States Patent and Trademark Office*